Patented July 28, 1931

1,816,006

UNITED STATES PATENT OFFICE

GEORGE J. EASTER, OF NIAGARA FALLS, NEW YORK, ASSIGNOR TO THE CARBORUNDUM COMPANY, OF NIAGARA FALLS, NEW YORK, A CORPORATION OF PENNSYLVANIA

MANUFACTURE OF ZIRCONIUM COMPOUND REFRACTORIES

No Drawing.    Application filed May 6, 1929.    Serial No. 361,007.

This invention relates to refractories of zirconium compounds and their method of manufacture in such a manner as to yield a product which is superior to the refractories which have hitherto been produced from compounds of zirconium.

The literature and the patent art contain numerous instances of refractories made of zirconium oxide or zirconium silicates. These materials have, in general, been bonded either with a clay binder or with finely ground zircon ($ZrSiO_4$) or zirconia ($ZrO_2$). The majority of such refractories commercially produced have used zircon in the form of beach sand as a major constituent. This material occurs in rounded particles of small size so that the resultant refractory has been relatively weak due to the difficulty of gripping the rounded particles by a bond, and has been subject to severe damage upon sudden heating and cooling, a characteristic which is frequently found in fine grained refractory bodies.

In other cases, the refractories have been made from zirconium oxide and have given trouble due to excessive shrinkage upon being fired. They have also been relatively weak at high temperatures. The modulus of rupture at 1350° C. has been approximately 75 to 150 lbs. per sq. in. Refractories of zirconium oxide continue to shrink in service even after having been fired to temperatures as high as 1600° C.

In an effort to escape the difficulties inherent in the use of fine grained zircon particles, I have secured large crystals of zircon, crushed these to various sizes ranging from ¼" down, and bonded such pieces with clay and with finely ground zircon. Refractories so produced were superior to those made of the smaller rounded particles commonly used. The crystal structure however proved rather weak in service.

I have found that the crystal structure can be materially improved and an extremely high grade refractory body produced by fusing zircon or other zirconic material (by which I mean material composed principally of zirconium compounds) in an electric furnace and suitably treating the fused material. To fuse this material I prefer to use an arc furnace of the type commonly used in fusing alumina for the manufacture of abrasives, although I have also used furnaces of the resistor type for the purpose, the difficulty in the latter case being to provide a suitable container for the molten material. In my preferred method, I use a water cooled iron shell, within which are suspended electrodes between which an arc is started by means of a carbon train or other suitable method. Zircon, of the beach sand type for example, is shoveled into the furnace and as fusion progresses, the electrodes are slowly raised and more zircon thrown in, the process being continued until the shell is filled. The semi-fused material congeals in contact with the iron shell thus protecting the latter from damage. The temperature of the molten bath is difficult to measure due to smoke and fumes obscuring the view, but is considerably in excess of 1800° C.

During the process the material in the furnace exhibits two characteristic stages. In the first stage it is somewhat pasty and can be readily drawn into fine strings. In the second stage it is much more liquid and the bath tends to be in violent agitation, as a result, I believe, of expulsion of part of the silica from the zirconium silicate. When after cooling, the fused mass is broken up it is found to consist principally of a dense grayish mass, with the upper portion shading to a buff color, and somewhat porous structure. The pig is apparently composed of a mixture of zirconium compounds including the silicate and oxide with some carbide and small amounts of metallic zirconium and perhaps carbon as impurities. The density of the fused material runs from about 4.2 to 5.3 (depending on the composition of the particular particles tested).

After the fused mass is cooled and removed from the furnace, I crush it to a suitable size, perhaps ⅛" and finer, and then roast it in an oxidizing atmosphere to convert the zirconium metal and zirconium carbide to zirconium oxide and to remove any remaining carbon. I have found that in cases where the material is not thus roasted, but is incorporated directly into a refractory mix, the refractory does not set up firmly upon being burned, but rather crumbles and cracks, resulting in a very weak structure. When however, the material has been thus roasted the tendency to crumble is eliminated. The roasting is accompanied by a change of color in the material from a mixture of light colored particles and darker materials to a relatively uniform buff color.

Although it would be imagined that fusion in the electric furnace would result in reducing the material to a condition of maximum density, I find that the density of the fused material increases still further on roasting, partly due to removal of the lighter constituents by oxidation and partly to shrinkage of the particles of the zirconic mixture. Densities from 4.8 to 5.6 are reached after roasting, depending upon the composition of the material and the heat treatment. It is, of course, desirable to complete most of the shrinkage of the particles before attempting to bond them, so that I preferably finish the roasting process at a temperature at least as high as that at which the bonded refractory is to be burned or used. The higher the roasting temperature is, the better the results which will be secured.

A representative chemical analysis of the roasted material is as follows:

|  | Per cent |
|---|---|
| $SiO_2$ | 18.1 |
| $ZrO_2$ | 79.3 |
| $TiO^2$, $Fe_2O_3$ etc | 2.6 |
|  | 100.0 |

The analysis shown corresponds to approximately 55 parts zirconium silicate plus 42 parts zirconium oxide. The relative amounts of zirconia and of zirconium silicate and of impurities may vary considerably.

In bonding the fused and roasted material I may use any suitable bond such as a finely ground zircon, although I prefer to use a small percentage of $Al_2O_3$. For example, the following mixture when mixed with a temporary binder, pressed and burned to 1600° C. for 6 hours showed a transverse strength of 982 lbs. per sq. in, at 1500° C.

|  | Per cent |
|---|---|
| 40 and finer fused material | 94 |
| Powdered alumina | 6 |

There is considerable burning shrinkage when burning a mix of the type just cited particularly if the fused material has been insufficiently roasted so that it is desirable to burn to 1500° C. or over in order to eliminate this objectionable characteristic in the resultant refractory.

Another bond which I have found to give excellent results is a finely pulverized mixture of zircon and rutile in various proportions, such as 40% zircon with 60% rutile. From 5 to 15% of this pulverized bond is added to the roasted fused material crushed to a suitable size, such as 14 mesh and finer or 40 mesh and finer, dependent upon the type of service for which the brick is intended. Refractories so bonded also require high burning temperatures as the bonds have a high vitrification range.

I have also found that fused material when mixed with 15% of silicate of soda makes an excellent refractory cement. In my work on bonds for this material I have discovered that when it is bonded with just enough alumina, magnesia, or other fluxing material to combine with the impurities present to form a relatively fusible bond, the article can be vitrified at lower temperatures and sets up harder than when a larger amount of bonding material is used.

Bricks produced in accordance with my invention as described are exceedingly resistant to spalling by sudden temperature changes and are highly resistant to acid slags. They are, however, attacked with relative readiness by basic fluxes. Their thermal conductivity is approximately double that of fire-clay brick, this being in marked contrast to the reports on zircon or zirconia refractories heretofore developed which have been alleged to have extremely low thermal conductivity.

Having now described my process of manufacture of bricks and the product secured, what I claim is:—

1. The process of manufacturing refractories which consists in fusing a compound of zirconium, crushing the fused material, roasting it in an oxidizing atmosphere, forming a refractory body of the material thus treated, and firing the body.

2. The method of making refractories which consists in fusing zirconium silicate, eliminating oxidizable materials from the fused mass, bonding the material thus produced, and burning the bonded article.

3. A refractory composed principally of a mixture of fused zirconium compounds which has been oxidized after fusion and prior to forming the refractory body.

4. The step in the process of manufacturing a refractory body from zirconic material which comprises roasting such material in an oxidizing atmosphere after fusion in an electric furnace and prior to forming this material into a refractory body.

5. The step in the process of manufacturing a refractory containing zirconic material which comprises fusing the zirconic material electrically, crushing the fused mass, and roasting the crushed material in an oxidizing atmosphere and prior to forming this material into a refractory body.

6. The step in the process of manufacturing a ceramic body of zirconic material which comprises roasting said material to cause it to shrink after fusing it in an electric furnace and prior to forming this material into a refractory body.

7. The step in the process of manufacturing a ceramic body from fused zirconic material which comprises oxidizing the oxidizable constituents of the fused mass and prior to forming this material into a refractory body.

8. The process of preparing zirconic material which comprises fusing zirconium silicate to volatilize such a material portion of the combined silica as to make the melt highly fluid, comminuting the fused material, and calcining it in an oxidizing atmosphere.

In testimony whereof I affix my signature.

GEORGE J. EASTER.